United States Patent
Chang

(10) Patent No.: US 9,423,652 B2
(45) Date of Patent: Aug. 23, 2016

(54) BACKLIGHT MODULE AND LIGHT SOURCE ASSEMBLY THEREOF

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 14/550,061

(22) Filed: Nov. 21, 2014

(65) Prior Publication Data

US 2015/0159834 A1 Jun. 11, 2015

(30) Foreign Application Priority Data

Dec. 5, 2013 (CN) .......................... 2013 1 0643429

(51) Int. Cl.

| | |
|---|---|
| *G09F 13/04* | (2006.01) |
| *G02F 1/1335* | (2006.01) |
| *G02B 5/02* | (2006.01) |
| *G02B 19/00* | (2006.01) |

(52) U.S. Cl.
CPC ..... *G02F 1/133605* (2013.01); *G02B 19/0023* (2013.01); *G02F 1/133603* (2013.01); *G02F 1/133606* (2013.01); *G02B 5/02* (2013.01); *G02B 5/0231* (2013.01); *G02B 19/0066* (2013.01)

(58) Field of Classification Search
CPC .... F21V 7/0025; F21V 7/0066; F21V 7/041; F21V 7/09; F21V 7/0008; F21S 48/1382; F21S 48/1388; G02F 1/133605; G02F 1/133606; G02B 19/0023; G02B 19/0019; G02B 5/021; G02B 5/0231; G02B 5/02
See application file for complete search history.

(56) References Cited

U.S. PATENT DOCUMENTS

| | | | | |
|---|---|---|---|---|
| 6,464,373 | B1* | 10/2002 | Petrick | F21V 7/041 362/247 |
| 8,059,230 | B2* | 11/2011 | Yeh | G02F 1/133603 362/97.1 |
| 2003/0063474 | A1* | 4/2003 | Coushaine | F21V 7/0008 362/346 |
| 2004/0183962 | A1* | 9/2004 | Hua-Nan | G02F 1/133604 349/64 |
| 2014/0063849 | A1* | 3/2014 | Chang et al. | G02F 1/133603 362/612 |

* cited by examiner

*Primary Examiner* — Y M. Lee
(74) *Attorney, Agent, or Firm* — ScienBiziP, P.C.

(57) ABSTRACT

A light source assembly includes a base plate, a light source secured on the base plate, a first reflection member, a second reflection member, and a diffusion plate. The first reflection member includes a base portion secured on the base plate and a plurality of protrusions with reflection surfaces inclined to the base plate. A through hole is defined on the base portion to receive the light source. Each protrusion protrudes from a side of the base portion away from the base plate and extends around the through hole. The second reflection member includes a reflection portion defining a plurality of light holes. The diffusion plate covers the second reflection member. Light emitting from the light source transmits to the light guide assembly via the reflection portion and the reflection surfaces.

12 Claims, 6 Drawing Sheets

BACKLIGHT MODULE AND LIGHT SOURCE ASSEMBLY THEREOF

FIELD

The subject matter herein generally relates to the field of liquid crystal displays, and in particular to a direct type backlight module and a light source assembly of the backlight module.

BACKGROUND

A liquid crystal display apparatus includes a liquid crystal display panel configured for displaying an image using light transmittance of liquid crystal and a backlight module disposed under the liquid crystal display panel to provide light to the liquid crystal display panel. The backlight module includes a plurality of light sources generating light required to display an image on the liquid crystal display panel. The backlight module can be classified as a direct type or as an edge type. In the direct type backlight module, the light sources are disposed under the liquid crystal display panel corresponding to an entire area of the liquid crystal display panel. In the edge type backlight module, the light sources are disposed under the liquid crystal display panel at a position corresponding to an edge portion of the liquid crystal display panel.

BRIEF DESCRIPTION OF THE DRAWINGS

Implementations of the present technology will now be described, by way of example only, with reference to the attached figures.

DETAILED DESCRIPTION

Figure 1:
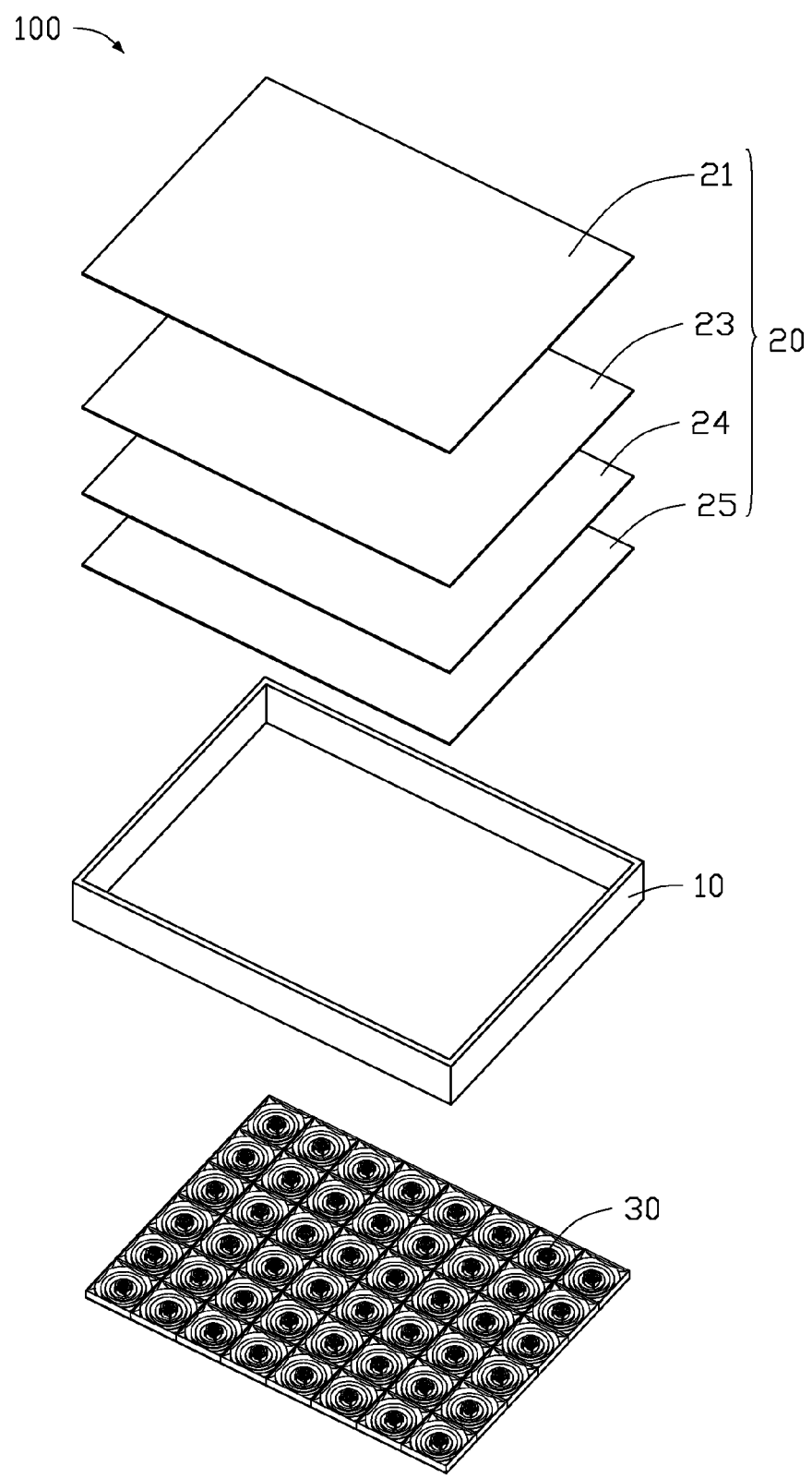
FIG. 1 is an exploded, isometric view of an embodiment of a backlight module including a light source assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A light source assembly can include a base plate, a light source secured on the base plate, and an encapsulation structure. The encapsulation structure can include a first reflection member, a second reflection member, and a diffusion plate. The first reflection member can include a base portion and a plurality of protrusions. The reflection member can be secured on the base plate and can define a through hole to receive the light source. The plurality of protrusions can protrude from a side of the base portion away from the base plate and can be arranged around a periphery of the through hole. Each protrusion can include a reflection surface inclined to the base plate. The second reflection member can include a reflection portion and a plurality of connecting portions. The reflection portion can define a plurality of light holes. The connecting portions can protrude from a circumference of the reflection portion and can be secured on the reflection surfaces of the protrusion adjacent to the through hole. The diffusion plate can be stacked on a side of the reflection portion away from the connecting portions.

A backlight module can include a frame, a light guide assembly received in the frame, and a plurality of light source assemblies received in the frame, located below the light guide assembly, and arranged in a matrix. Each light source assembly can include a base plate, a light source secured on the base plate, and an encapsulation structure. The encapsulation structure can include a first reflection member, a second reflection member, and a diffusion plate. The first reflection member can include a base portion and a plurality of protrusions. The base portion can be secured on the base plate and can define a through hole to receive the light source. The plurality of protrusions can protrude from a side of the base portion away from the base plate, and can be arranged around a periphery of the through hole. Each protrusion can include a reflection surface inclined to the base plate. The second reflection member can include a reflection portion and a plurality of connecting portions. The reflection portion can define a plurality of light holes. The connecting portions can protrude from a circumference of the reflection portion and can be secured on the reflection surfaces of the protrusion adjacent to the through hole. The diffusion plate can be stacked on a side of the reflection portion away from the connecting portions.

FIG. 1 illustrates an embodiment of a backlight module 100. The backlight module 100 can include a frame 10; a light guide assembly 20 received in and supported by the frame 10, and a plurality of light source assemblies 30 received in the frame 10 and located below the light guide assembly 20. The plurality of light source assemblies 30 can be arranged in a matrix. The frame 10 can be made of metal or plastic having a highly reflective property. In at least one embodiment, the frame 10 can be made of metal or plastic which can be coated with a highly reflective coating layer. The light guide assembly 20 can include a first diffusion sheet 21, a prism sheet 23, a second diffusion sheet 24, and a diffusion plate 25 stacked consecutively in order.

Figure 2:
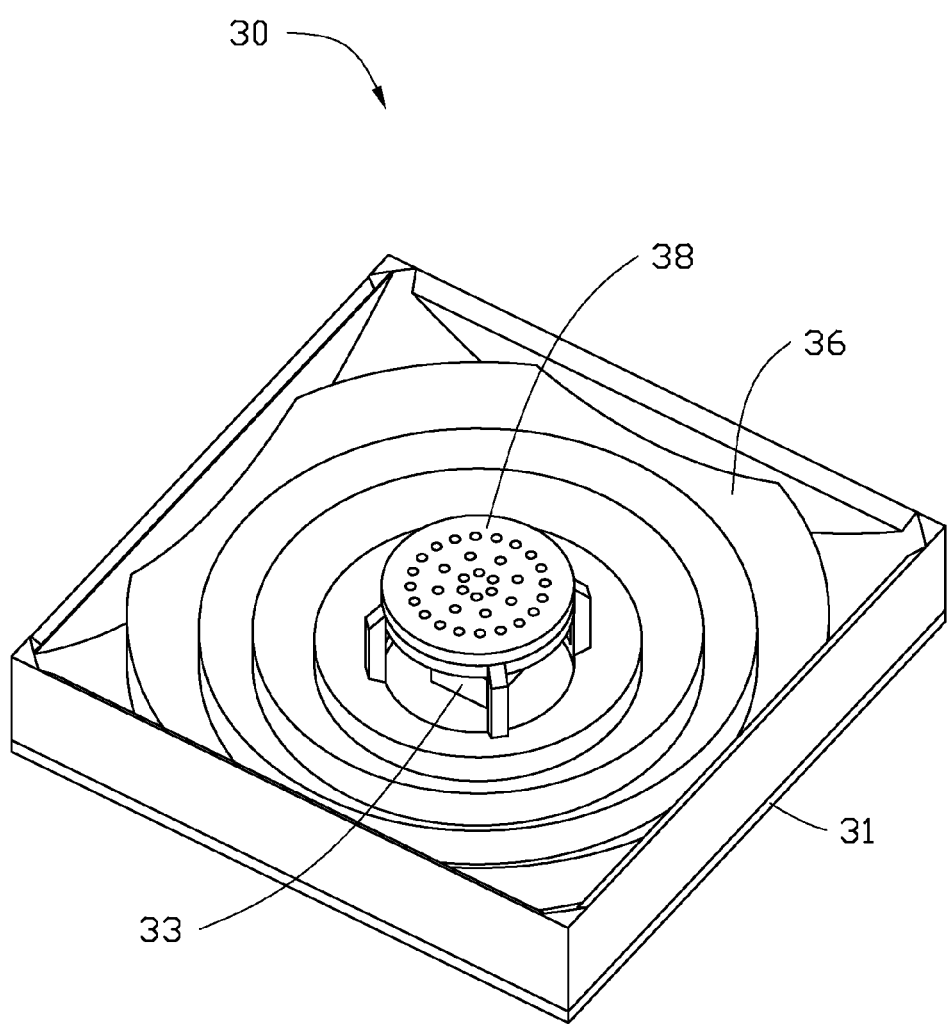
FIG. 2 is an isometric view of the light source assembly of FIG. 1.
Figure 3:
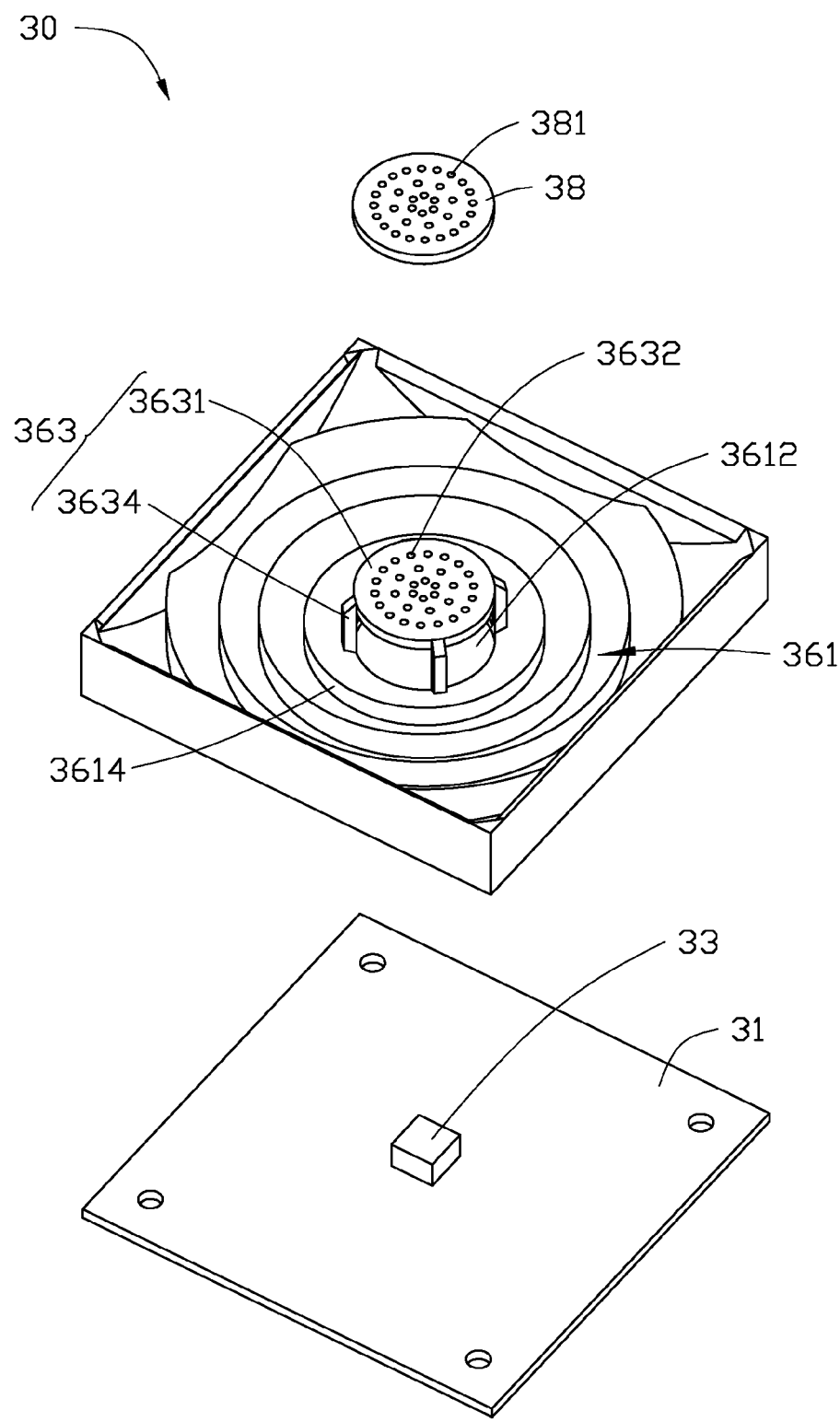
FIG. 3 is an exploded, isometric view of the light source assembly of FIG. 2.
Figure 4:
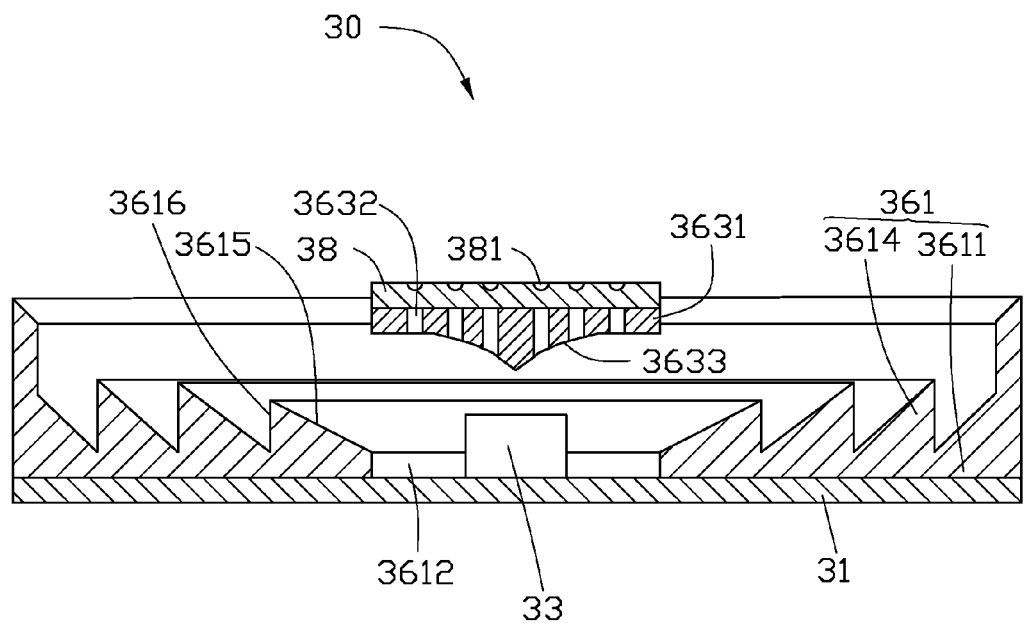
FIG. 4 is a cross-sectional view of the light source assembly of FIG. 2, taken along line IV-IV.

FIGS. 2-4 illustrate that each light source assembly 30 can include a base plate 31, a light source 33 secured on a central portion of the base plate 31, an encapsulation structure 36 secured on the base plate 31 and covering the light source 33, and a diffusion plate 38 positioned on the encapsulation structure 36. The encapsulation structure 36 can be substantially rectangular, and can include a first reflection member 361 and a second reflection member 363 secured on the first reflection member 361.

The first reflection member 361 can be substantially rectangular, and can include a base portion 3611 and a plurality of protrusions 3614. The base portion 3611 can be a plate and can be secured on the base plate 31. A through hole 3612 can be defined at a central portion of the base portion 3611. The through hole 3612 can be configured to receive a corresponding light source 33. The plurality of protrusions 3614 can protrude from a side of the base portion 3611 away from the base plate 31. Each protrusion 3614 can be substantially V-shaped and can extend around a periphery of the through hole 3612 parallel to each other. Each protrusion 3614 can include a reflection surface 3615 and a connecting surface 3616 connected to the reflection surface 3615. Each connecting surface 3616 can interconnect with the two reflection surfaces 3615 of the two adjacent protrusions 3614. The reflection surface 3615 can be located on a side of the protrusion 3614 adjacent to the through hole 3612, and the connecting surface 3616 can be located on another side of the protrusion 3614 away from the through hole 3612. Each reflection surface 3615 can be inclined to the base plate 31, and each connecting surface 3616 can be vertical to the base plate 31. Therefore, an angle between the reflection surface 3615 and the connecting surface 3616 of one protrusion 3614 can be an acute angle. In at least one embodiment, the reflection surfaces 3615 can be inclined planes or curved surfaces.

The second reflection member 363 can be secured on the first reflection member 361 corresponding to the through hole 3612, and configured to cover and reflect light emitted from the light source 33. The second reflection member 363 can include a reflection portion 3631 and a plurality of connecting portions 3634 protruding from a circumference of the reflection portion 3631. The plurality of connecting portions 3634 can be positioned around the periphery of the through hole 3612, spaced away from each other, and secured on the reflection surface 3615 adjacent to the through hole 3612 to support the reflection portion 3631. The reflection portion 3631 can be substantially disc-shaped. A center line of the reflection portion 3631 can coincide with the center line of the through hole 3612. The reflection portion 3631 can include a conic curved surface 3633 located on a side adjacent to the through hole 3612 and protruding toward the light source 33. The reflection portion 3631 can define a plurality of light holes 3632 through the conic curved surface 3633. The light holes 3632 can be configured to transmit the light emitted from the light source 33 to the second reflection member 363. In at least one embodiment, the first reflection member 361 and the second reflection member 363 can both be made of metal or plastic having a highly reflective property. The light holes 3632 can be evenly distributed on the conic curved surface 3633. Reflection layers (not shown) can be coated on the first reflection member 361 and the second reflection member 363 to increase a reflection ability of the first reflection member 361 and the second reflection member 363. The first reflection member 361 and the second reflection member 363 can be integrated.

The diffusion plate 38 can be stacked on a side of the reflection portion 3631 away from the connecting portion 3634. The diffusion plate 38 can define a plurality of grooves 381 on a side away from the reflection portion 3631. Each groove 381 can correspond with one light hole 3632; therefore the light can be evenly dispersed to the light guide assembly 20 via the light holes 3632 and the grooves 381. In at least one embodiment, the diffusion plate 38 can be made of a transparent plastic sheet. A plurality of diffusion particles (not shown) can be dispersed in the diffusion plate 38.

Figure 5:
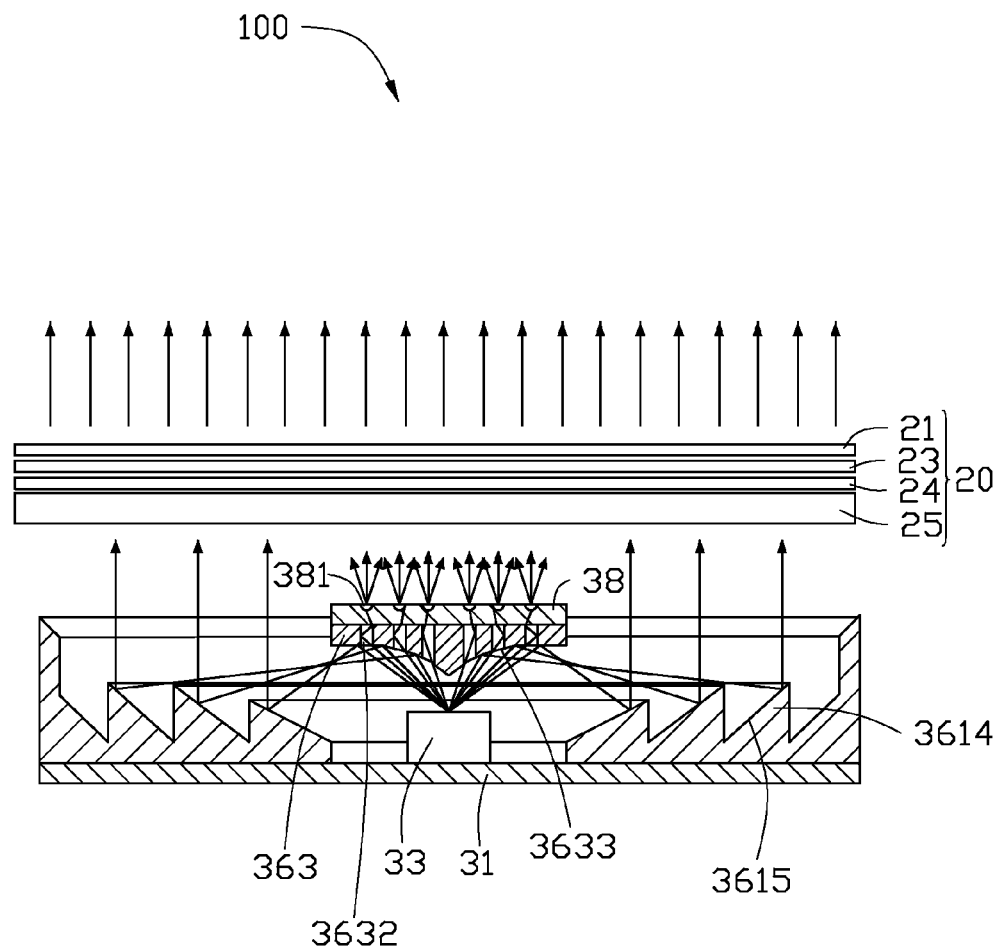
FIG. 5 is similar to FIG. 4, but showing the light source assembly in a use state.

FIG. 5 illustrates when in use, the light source 33 can emit light to the light guide assembly 20. A part of the light can be directly transmitted to the diffusion plate 38 via the light holes 3632, and then be diffused to form uniform light by the diffusion plate 38; the uniform light can be transmitted to the light guide assembly 20. Another part of the light can be reflected to the protrusions 3614 via the conic curved surface 3633 of the second reflection member 363, and then be reflected by the reflection surfaces 3615 of the protrusions 3614 to form uniform light, and the uniform light can be transmitted to the light guide assembly 20.

The light emitting to a position of the conic curved surface 3633 adjacent to the vertex can be reflected to the reflection surfaces 3615 away from the through hole 3612, as well, the light emitting to a position of the conic curved surface 3633 away from the vertex can be reflected to the reflection surfaces 3615 adjacent to the through hole 3612. In at least one embodiment, by adjusting the surface curvature of the conic curved surface 3633 and slopes of the reflection surfaces 3615, all of the light emitting via the light source 33 can be reflected to the conic curved surface 3633, and then be reflected to the light guide assembly 20.

Figure 6:
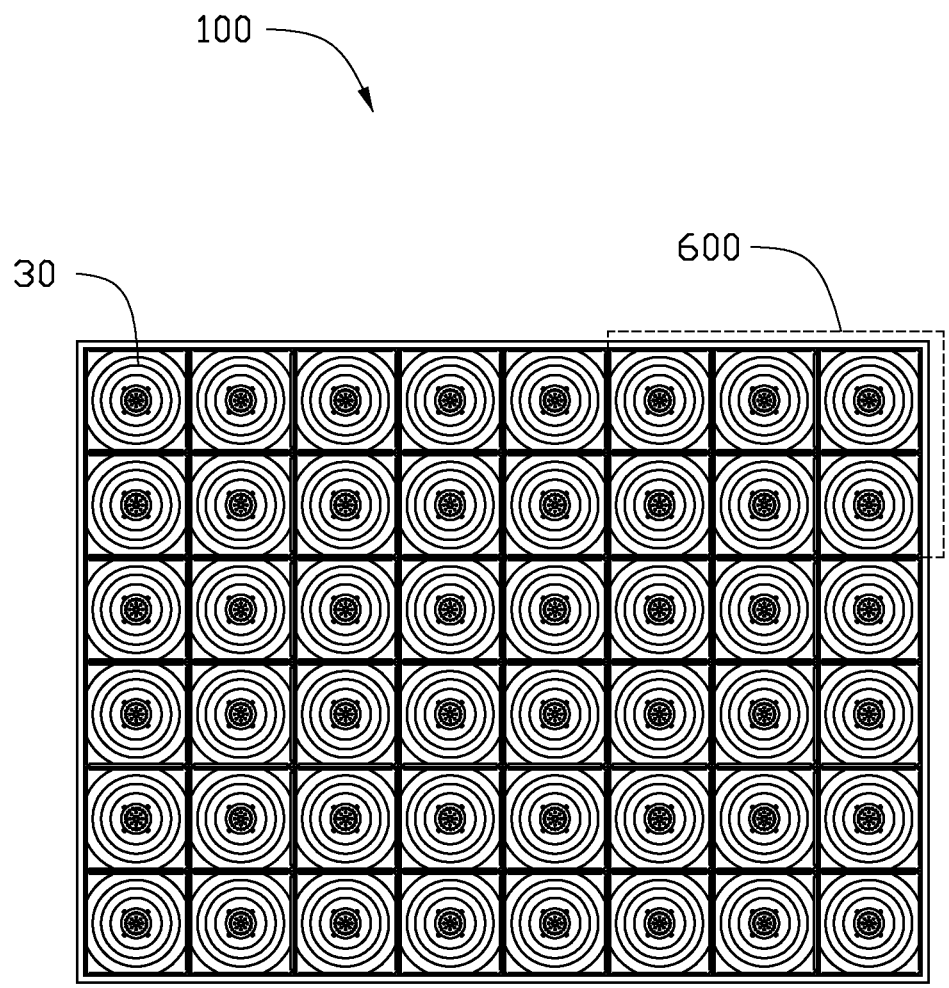
FIG. 6 is a top view of the backlight module of FIG. 1 in a use state.

The light source assemblies 30 can be controlled by independent driving circuits (not shown), in this way, any part of the backlight module can be illuminated independently. FIG. 6 illustrates the light sources in the area 600 can be illuminated by the corresponding driving circuits.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A light source assembly comprising:
   a base plate;
   a light source secured on the base plate; and
   an encapsulation structure comprising:
      a first reflection member comprising:
         a base portion secured on the base plate and defining a through hole to receive the light source, and
         a plurality of protrusions protruding from a side of the base portion away from the base plate and arranged around a periphery of the through hole, each protrusion comprising a reflection surface inclined to the base plate,
      a second reflection member comprising:
         a reflection portion defining a plurality of light holes, and
         a plurality of connecting portions protruding from a circumference of the reflection portion and secured on the reflection surface of the protrusion adjacent to the through hole, and
      a diffusion plate stacked on a side of the reflection portion away from the connecting portions;

wherein a plurality of grooves are defined on a side of the diffusion plate away from the reflection portion, and each groove corresponds with one light hole.

2. The light source assembly of claim 1, wherein the reflection portion comprises a conic curved surface located on a side adjacent to the through hole and protruding toward the light source.

3. The light source assembly of claim 2, wherein the plurality of light holes are evenly distributed on the conic curved surface.

4. The light source assembly of claim 1, wherein each protrusion further comprises a connecting surface connected to the reflection surface, and each connecting surface interconnects with the two reflection surfaces of two adjacent protrusions.

5. The light source assembly of claim 1, wherein the first reflection member and the second reflection member are made of metal or plastic with a highly reflective property.

6. The light source assembly of claim 1, wherein the first reflection member and the second reflection member are integrated.

7. A backlight module comprising:
a frame;
a light guide assembly received in the frame; and
a plurality of light source assemblies received in the frame, located below the light guide assembly, and arranged in a matrix, each light source assembly comprising:
a base plate;
a light source secured on the base plate; and
an encapsulation structure comprising:
a first reflection member comprising:
a base portion secured on the base plate and defining a through hole to receive the light source, and
a plurality of protrusions protruding from a side of the base portion away from the base plate and arranged around a periphery of the through hole, each protrusion comprising a reflection surface inclined to the base plate,
a second reflection member comprising:
a reflection portion defining a plurality of light holes, and
a plurality of connecting portions protruding from a circumference of the reflection portion and secured on the reflection surface of the protrusion adjacent to the through hole, and
a diffusion plate stacked on a side of the reflection portion away from the connecting portions.

8. The backlight module of claim 7, wherein the reflection portion comprises a conic curved surface located on a side adjacent to the through hole and protruding toward the light source.

9. The backlight module of claim 7, wherein the plurality of light holes are evenly distributed on the conic curved surface.

10. The backlight module of claim 7, wherein each protrusion further comprises a connecting surface connected to the reflection surface, and each connecting surface interconnects with the two reflection surfaces of two adjacent protrusions.

11. The backlight module of claim 7, wherein a plurality of grooves are defined on a side of the diffusion plate away from the reflection portion, and each groove corresponds with one light hole.

12. The backlight module of claim 7, wherein the light guide assembly comprises a first diffusion sheet, a prism sheet, a second diffusion sheet, and a diffusion plate stacked consecutively in order.

* * * * *